United States Patent
Starkweather

(10) Patent No.: US 6,491,496 B2
(45) Date of Patent: Dec. 10, 2002

(54) TURBINE AIRFOIL WITH METERING PLATES FOR REFRESHER HOLES

(75) Inventor: John Howard Starkweather, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 91 days.

(21) Appl. No.: 09/791,177

(22) Filed: Feb. 23, 2001

(65) Prior Publication Data

US 2002/0119045 A1 Aug. 29, 2002

(51) Int. Cl.[7] ................................................. F01D 5/18
(52) U.S. Cl. ..................................... 416/97 R; 415/115
(58) Field of Search ................................. 415/115, 116; 416/96 R, 97 R

(56) References Cited

U.S. PATENT DOCUMENTS

| | | | |
|---|---|---|---|
| 2,991,973 A | | 7/1961 | Cole et al. |
| 3,706,508 A | | 12/1972 | Moskowitz et al. |
| 4,236,870 A | | 12/1980 | Hucul, Jr. et al. |
| 4,278,400 A | * | 7/1981 | Yamarik et al. ........... 416/97 R |
| 4,761,116 A | * | 8/1988 | Braddy et al. ................. 416/92 |
| 4,775,296 A | * | 10/1988 | Schwarzmann et al. .. 416/97 R |
| 5,387,086 A | | 2/1995 | Frey et al. |
| 5,403,156 A | | 4/1995 | Arness et al. |
| 5,902,093 A | | 5/1999 | Liotta et al. |
| 5,967,752 A | * | 10/1999 | Lee et al. .................. 416/97 R |
| 5,975,850 A | | 11/1999 | Abuaf et al. |
| 6,132,169 A | | 10/2000 | Manning et al. |
| 6,139,269 A | * | 10/2000 | Liang ........................ 416/97 R |
| 6,220,817 B1 | * | 4/2001 | Durgin et al. ............. 416/97 R |

* cited by examiner

Primary Examiner—Edward K. Look
Assistant Examiner—Ninh Nguyen
(74) Attorney, Agent, or Firm—Steven J. Rosen; Rodney M. Young

(57) ABSTRACT

A gas turbine engine hollow airfoil has chordally spaced apart leading and trailing edges extending radially from a radially inner base to a radially outer airfoil tip. A cooling circuit within the airfoil has radially extending first, middle, and last channels arranged respectively in series with the first channel in fluid communication with a source of cooling air from outside the airfoil. The last channel is in fluid communication with one of the edges. A refresher passageway extends through a radially inner wall bounding a radially inner portion of the last channel and is in fluid communication with the source of cooling air. The refresher passageway is separate, spaced apart, and independent from the first channel. In one embodiment, a metering plate covers an inlet to the refresher passageway and the metering plate has a metering hole over the inlet and the metering hole is adjustable.

18 Claims, 3 Drawing Sheets

TURBINE AIRFOIL WITH METERING PLATES FOR REFRESHER HOLES

BACKGROUND OF THE INVENTION

1. Field of the Invention

The present invention relates generally to cooling air circuits of turbine rotor blades and stator vanes in gas turbine engines and, more specifically, to metering plates at the base of roots used to meter flow to the cooling circuits within airfoils of the blades and vanes.

2. Discussion of the Background Art

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example. A turbine stage includes a row of turbine rotor blades secured to the outer perimeter of a rotor disk with a stationary turbine nozzle having a plurality of stator vanes disposed upstream therefrom. The combustion gases flow between the stator vanes and between the turbine blades for extracting energy to rotate the rotor disk. The temperatures within gas turbines may exceed 2500 degrees Fahrenheit and cooling of turbine blades is very important in terms of blade longevity. Without cooling, turbine blades would rapidly deteriorate. Improved cooling for turbine blades is very desirable and much effort has been devoted by those skilled in the blade cooling arts to devise improved geometries for the internal cavities within turbine blades in order to enhance cooling. Since the combustion gases are hot, the turbine vanes and blades are typically cooled with a portion of compressor air bled from the compressor for this purpose. Diverting any portion of the compressor air from use in the combustor necessarily decreases the overall efficiency of the engine. Accordingly, it is desired to cool the vanes and blades with as little compressor bleed air as possible.

Typical turbine vanes and blades include an airfoil over which the combustion gases flow. The airfoil, typically, includes one or more serpentine cooling passages therein through which cooling air from compressor bleed air is channeled for cooling the airfoil. The airfoil may include various turbulators therein for enhancing cooling effectiveness and the cooling air is discharged from the passages through various film cooling holes disposed around the outer surface of the airfoil. In pursuit of higher cooling effectiveness, modern blades have led to multi-pass cooling circuits.

It is also known to pass the cooling air through serpentine cooling air circuits and other passages in the interior of the blade which warms up the cooling air as it travels through the passages before being impinged on the leading edge of the blade. The temperature difference across the leading edge is lower than directing cooling air through the root of the blade for impingement resulting in lower thermal stresses in the blade leading edge and the life of the blade is enhanced. This makes efficient use of cooling flow since the flow is able to internally cool the blade over much of the blade mid-span before flowing out radial leading edge cooling holes to film cool the blade airfoil externally.

However, this technique also adversely effects "backflow margin". As air flow travels through the internal passages of the blade, pressure losses due to turns and turbulence promoters cause the cooling flow pressure to drop to a level, such that under certain operating conditions, hot gas ingestion into the blade leading edge may occur. This undesired condition is referred to as backflow. One approach for providing more backflow margin is to increase the inlet pressure of the cooling air which is supplied to the blade. This approach is not always feasible because the increase in supply pressure can increase cooling flow leakages to an undesired level. To overcome this problem, leading edge flow passages supplying cooling air for impingement were supplied with refresher passageways. The refresher passageway is connected to a portion of a first channel of the cooling circuit in the root of the blade. This circuit supplies impingement cooling air to the leading edge cavity from its last channel referred to herein as a leading edge supply channel. The refresher passageway refreshes the airflow in this last channel after the airflow has flowed through the rest of the circuit and has become warmed. See U.S. Pat. Nos. 5,387,086 and 5,813,826.

The refresher passageway to the leading edge supply channel is connected to the serpentine cooling circuit inlet channel which passes through the root of the blade and, thus, is coupled to the flow rate through the serpentine cooling circuit. It is desirable to be able to tune the cooling flow through the refresher passageway independent of the flow through the serpentine cooling circuit in order to adjust the flow and pressure to the leading edge supply channel. This would be particularly useful if a blade casting is produced which has higher than desired pressure drops through the serpentine passages or impingement holes. This is also desirable for adjustments to the blade cooling circuit that are useful or necessary due to blade hole and serpentine circuit deterioration such as may be caused by blockages and wear.

Known turbine airfoil cooling techniques include the use of internal cavities forming a serpentine cooling circuit. Particularly, serpentine passages, leading edge impingement bridges, turbulence promoters and turbulators, film holes, pin fins, and trailing edge holes or pressure side bleed slots are utilized for blade cooling. It is desirable to provide improved blade cooling. In providing even better blade cooling, it is also desirable to avoid significantly increasing the blade fabrication costs.

SUMMARY OF THE INVENTION

A gas turbine engine hollow airfoil has an airfoil outer wall with widthwise spaced apart pressure and suction side walls joined together at chordally spaced apart leading and trailing edges of the airfoil and extending radially from a radially inner base to a radially outer airfoil tip. A cooling circuit within the airfoil has radially extending first, middle, and last channels arranged respectively in series with the first channel in fluid communication with a source of cooling air from outside the airfoil. The last channel is in fluid communication with one of the edges. A refresher passageway extends through a radially inner wall bounding a radially inner portion of the last channel and is in fluid communication with the source of cooling air. The refresher passageway is separate, spaced apart, and independent from the first channel.

One exemplary embodiment of the invention further includes an edge cooling plenum located between the last channel and one of the edges and cooling air discharge apertures disposed through a radially extending rib between the last channel and the edge cooling plenum. The edge cooling plenum may be a leading edge cooling plenum and the cooling air discharge apertures may be impingement cooling holes and may also include leading edge cooling holes leading out of the edge cooling plenum through the outer wall around the leading edge. In another exemplary embodiment, the last channel is bounded by the trailing edge and cooling air discharge apertures are disposed through the trailing edge and may be trailing edge cooling slots.

Exemplary embodiments of the invention may further include a metering plate covering an inlet to the refresher passageway and the metering plate has a metering hole over the inlet and the metering hole is adjustable. Another exemplary embodiment of the invention is a gas turbine engine blade with the hollow airfoil extending radially outwardly from a root. The first channel extends through the root and has an entrance at a bottom surface of the root. The refresher passageway extends through a radially inner wall bounding a radially inner portion of the last channel and through the root. The inlet to the refresher passageway is located at the bottom surface of the root and is separate and spaced apart from the entrance of the first channel. The metering plate is disposed on the bottom surface of the root.

In another exemplary embodiment of the invention, a forward flowing serpentine cooling circuit and an aft flowing serpentine cooling circuit are located within the airfoil. Each of the cooling circuits has the radially extending first, middle, and last channels arranged respectively in series and each of the first channels extend through the root and have an entrance at a bottom surface of the root. The last channel of the forward flowing serpentine cooling circuit is in fluid communication with the leading edge and the last channel of the aft flowing serpentine cooling circuit is in fluid communication with the trailing edge. Forward and aft refresher passageways extend through forward and aft radially inner walls bounding radially inner portions of the forward and aft last channels, respectively, and through the root. The refresher passageways have inlets at the bottom surface of the root and the inlets are separate and spaced apart from the entrances.

The cooling circuit configuration of the present invention allows the use of a lower coolant supply pressure. The three pass serpentine is also less vulnerable to variations in pressure drops from cast features than the circuits having more channels and passes. Dedicated circuits or channels for leading edge and trailing edge cooling provide better internal cooling at the edges where the external heat load is highest. The refresher passageways mix in cooler air for the benefit of the edges and, thus, reduce the amount of cooling that has to go through the serpentine cooling circuits and incur flow losses due to friction and turning. The refresher passageways allow a lighter design with less cavities for cooling to be practical at higher turbine temperatures than before. The present invention allows weight reduction of the airfoil and blade and more cooling flow to be used at the leading and trailing edges. The invention can also help protect against airfoil and blade failure due to foreign object damage, a hard rub, or other cause which results in a hole in a serpentine at a tip turn. Other circuits will lose the coolant out the hole and starve the rest of the serpentine cooling circuit. The refresher passageways will provide flow at the root of each cavity to reduce the thermal distress due to loss of coolant from the serpentine circuit. The airfoil and blade design of the present invention increases producibility and production yield because the refresher holes can be tuned to provide more flow and pressure to the edges if a casting comes which has higher than desired pressure drops in the serpentine circuit or impingement holes. Prior art designs the situation would require scrapping parts and waiting for a casting core die rework. The present invention provides metering plates that are adjustable and, therefore, can be used to adjust amount of cooling flow to the edges. The metering plate with a metering hole, which may be brazed over the inlet to the refresher passageway allows for a sturdy core during casting, a light weight shank, and adjustable metering of the refresher flow.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
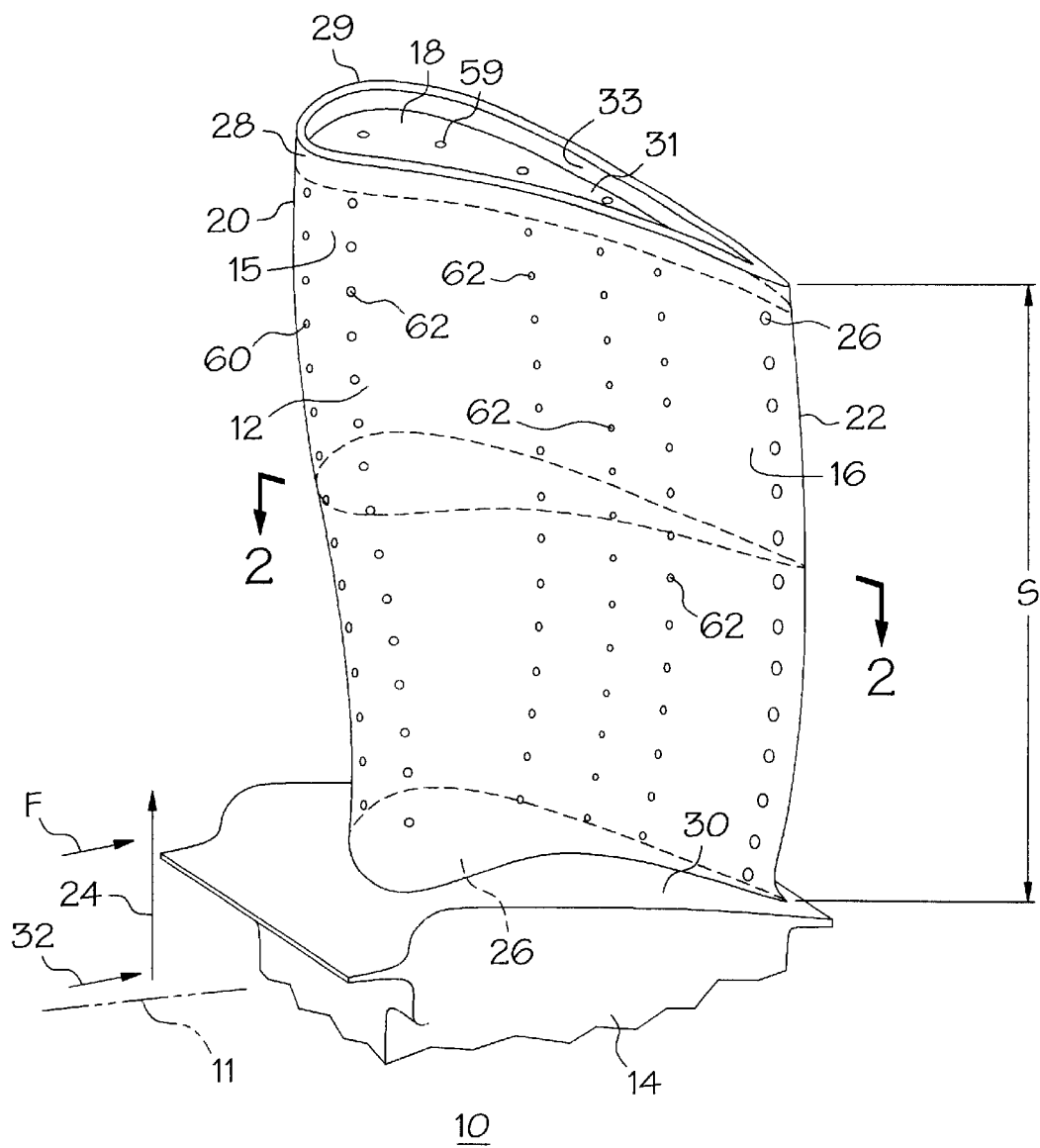
FIG. 1 is a perspective view of a gas turbine engine turbine rotor blade which incorporates the airfoil of the invention.

Illustrated in FIG. 1 is an exemplary turbine blade 10 for a gas turbine engine designed to be operated in a hot gas stream that flows in an axial flow downstream direction F. The blade 10 includes a hollow airfoil 12 extending radially outwardly from a root 14. The root 14 is used to secure the blade 10 to a rotor disk (not shown) of the engine which is circumscribed about an engine centerline 11. As further illustrated in a cross-section of the airfoil 12 in FIG. 2, the airfoil 12 includes an outer wall 15 widthwise or transversely spaced apart pressure and suction side walls 16 and 18, respectively, joined together along an upstream leading edge 20 and a downstream trailing edge 22 which is spaced chordally apart from the leading edge. The airfoil 12 extends radially in a radial direction 24 away from the engine centerline 11 in a spanwise direction of the airfoil 12 from a radially inner base 26 to a radially outer airfoil tip 28 along a span S of the airfoil. The airfoil tip 28 is illustrated as a squealer tip having an outward extension from the outer wall 15 or a squealer wall 29 extending radially outward from and peripherally around an outer tip wall 31 forming a squealer tip cavity 33 therein. Tip cooling holes 59 extending through the outer tip wall 31 from within the hollow airfoil 12 to the squealer tip cavity 33 are used to cool the tip cavity. The radially inner base 26 is defined at a conventional platform 30 which forms the inner flow boundary of the blade 10 and below which extends the root 14.

During operation of the blade 10, combustion gases 32 are generated by a combustor (not shown) and flow downstream over both air foil pressure and suction side walls 16 and 18, respectively, of the outer wall 15. The exemplary embodiment of the present invention illustrated herein is designed to effect efficient cooling of the airfoil 12 to better match the distribution of the heat load thereto from the combustion gases 32. The gas turbine blade 10 illustrated in FIGS. 1—3 is exemplary and the invention applies equally as well to turbine stator vanes having similar airfoils which may be similarly cooled.

Figure 2:
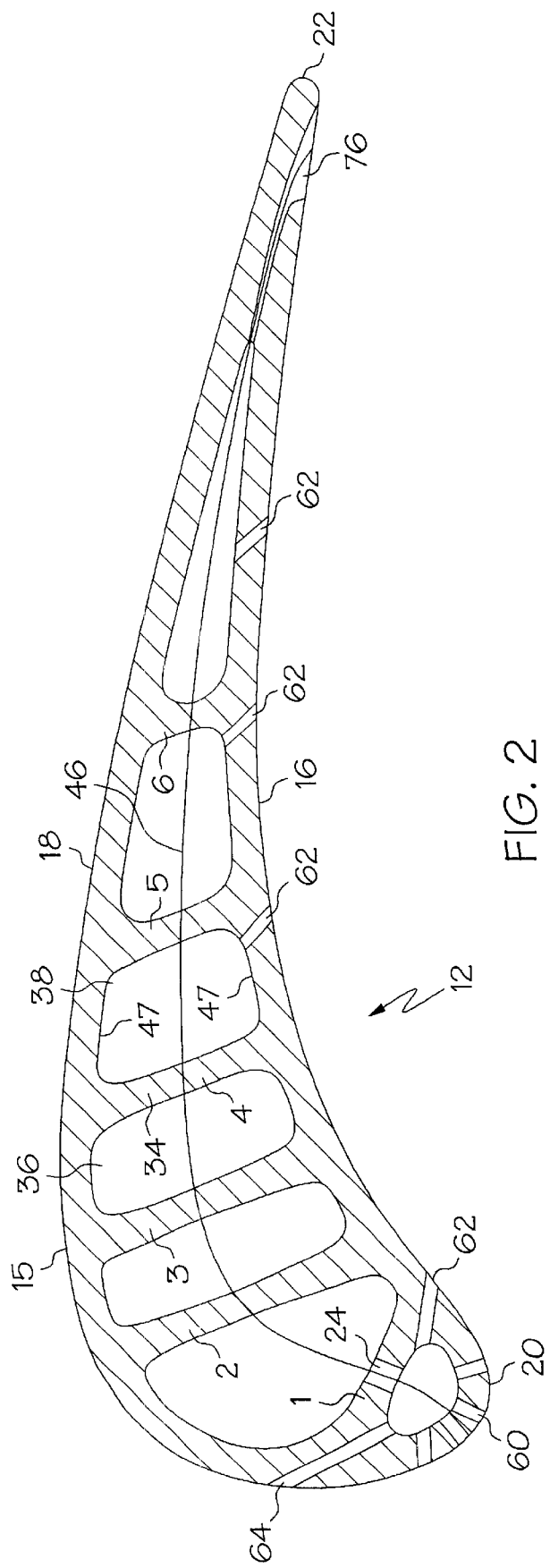
FIG. 2 is a sectional schematic illustration of an airfoil mid-span cross-section through line 2—2 of the airfoil in FIG. 1.

More specifically referring to FIG. 2, the hollow airfoil 12 is illustrated in cross-section with the outer wall 15 and the pressure and suction side walls 16 and 18, respectively, spaced circumferentially or laterally apart from each other between the leading and trailing edges 20 and 22. The pressure and suction side walls 16 and 18 are integrally joined together by a plurality of internal transverse ribs indicated generally at 34 which extend between the pressure and suction side walls 16 and 18, respectively. First, second, third, and four th ribs 1–4, respectively, of the transverse ribs 34 define a single forward flowing three pass serpentine cooling circuit 36 as illustrated in FIG. 3. The fourth rib 4, fifth and sixth ribs 5 and 6, and the trailing edge 22 define a single aft flowing three pass serpentine cooling circuit 38.

Figure 3:
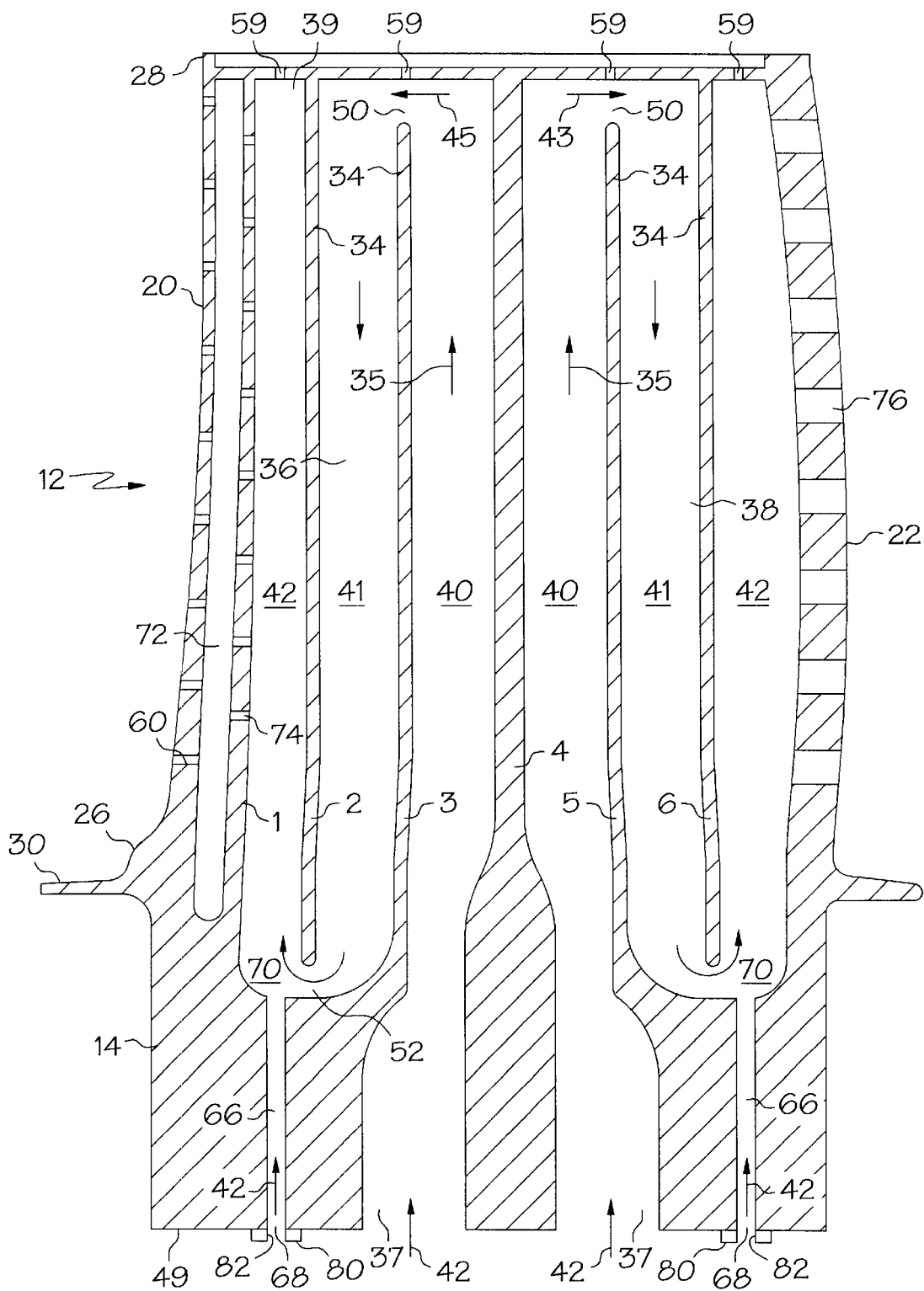
FIG. 3 is a sectional illustration of the exemplary gas turbine engine airfoil illustrated in FIGS. 1 and 2 laid out flat along a split-line in FIG. 2 through a downstream flowing serpentine cooling circuit therein.

FIG. 3 illustrates the airfoil 12 laid out flat along a cooling circuit split-line 46 in FIG. 2 that passes through the forward and aft flowing serpentine cooling circuits 36 and 38. The forward flowing serpentine cooling circuit 36 is constructed so as to cause a serpentine cooling flow 35 within the cooling circuit 36 to flow in a forward chordal flow direction 45, forwards from the trailing edge 22 to the leading edge 20 within the forward flowing serpentine cooling circuit 36. The forward flowing cooling circuit 36 includes an entrance 37 at a bottom surface 49 of the root 14 and is positioned aft of a terminal end 39 of the forward flowing cooling circuit to cause the serpentine cooling flow 35 to flow in the forward chordal flow direction 45 forwards from the trailing edge 22 to the leading edge 20. The aft flowing serpentine cooling circuit 38 is constructed so as to cause the serpentine cooling flow 35 within the aft flowing serpentine cooling circuit 38 to flow in an aft chordal flow direction 43 afterwards from the leading edge 20 to the trailing edge 22 within the aft flowing serpentine cooling circuit 38. The aft flowing serpentine cooling circuit 38 includes an entrance 37 in the bottom surface 49 of root 14 and is positioned forward of a terminal end 39 of the aft flowing serpentine cooling circuit to cause the serpentine cooling flow 35 to flow in the aft chordal flow direction 43 afterwards from the leading edge 20 to the trailing edge 22. This is to better match the applied heat loads from the combustion gases 32 and to more effectively tailor the serpentine cooling flows 35 to the heat loading of the airfoil 12 and more effectively cool the airfoil.

The forward and aft flowing serpentine cooling circuits 36 and 38 are referred to as a three pass circuit because they each have three radially extending channels denoted as first, middle, and last cooling channels 40, 41, and 42. The invention may have more than the one middle channel as illustrated in the exemplary embodiment herein. The first, middle, and last cooling channels 40, 41, and 42 of the forward flowing serpentine cooling circuit 36 are defined by and disposed between the chordally spaced apart internal ribs 34 denoted as the first through fourth ribs 1–4, respectively, in FIG. 3 and bounded on their transverse sides 47 (illustrated in FIG. 2) by the pressure side and suction side walls 16 and 18.

The first channels 40 of the forward and aft flowing serpentine cooling circuits 36 and 38 extend radially through the base 26 of the airfoil 12 and through the root 14 of the blade 10 and radially upwardly to radially outer first turning channels 50. The first channels 40 of the forward and aft flowing serpentine cooling circuits 36 and 38 begin at the entrances 37 in the bottom surface 49 of the root 14 of the airfoil 12. The first turning channels 50 turn the cooling air radially inwardly into the middle cooling channel 41 (or if more than one then middle cooling channels) which direct the cooling air radially inwardly to radially inner second turning channels 52, which in turn, direct the cooling air radially upwardly into the last cooling channels 42. The last cooling channels 42 and the forward and aft flowing serpentine cooling circuits 36 and 38 terminate at the outer tip wall 31 where one or more of the tip cooling holes 59 may be used to vent the serpentine cooling circuits. The airfoil squealer tip is cooled by the tip cooling hole 59 in the outer tip wall 31. The placement of the tip cooling holes 59 in radially outer ends of one or more of the first, middle, and/or last cooling channels 40, 41, and 42 permits better control and metering of cooling air to the squealer type airfoil tip 28.

In the exemplary embodiment illustrated herein, a leading edge cooling plenum 72 is located between the leading edge 20 of the outer wall 15 and the first rib 1. Discharge apertures, which in the exemplary embodiment function, are impingement cooling holes 74, are disposed and extend through the first rib 1 from the last channel 42 of the forward flowing serpentine cooling circuit 36 to the leading edge cooling plenum 72. The impingement cooling holes 74 feed cooling air from the last channel 42 of the forward flowing serpentine cooling circuit 36 to the leading edge cooling plenum 72 from where it is flowed through film cooling holes. The film cooling holes include one or more of the following: shower head, pressure side wall, and suction side wall film cooling holes 60, 62, and 64, respectively.

In the exemplary embodiment illustrated herein, the trailing edge 22 is cooled by cooling air passed through discharge apertures in the form of trailing edge cooling slots 76 designed to provide convective cooling of the trailing edge 22. These two arrangements are used to cool the leading and trailing edges 20 and 22, respectively.

Refresher passageways 66 extend through radially inner walls bounding radially inner portions 70 of said last channels 42 of the forward and aft flowing serpentine cooling circuits 36 and 38. The refresher passageways 66 extend all the way through the root 14 and are in fluid communication with a source of cooling air outside the airfoil 12 and the refresher passageways 66 operate independent and separate from the forward and aft flowing serpentine cooling circuits 36 and 38. The refresher passageways 66 have inlets 68 in the bottom surface 49 of the root 14 and the inlets are spaced apart from the entrances 37 of the forward and aft flowing serpentine cooling circuits 36 and 38. Two metering plates 80 are disposed on the bottom surface 49 of the root 14 and each one covers one of the inlets 68 to the refresher passageways 66. Each of the metering plates has a metering hole 82 centered over the inlet. The metering plates are adjustable and therefore can be used to adjust amount of cooling flow to the edges. The adjustability is provided by opening up the hole by increasing its diameter or area or by using plates with different hole sizes. The metering plate 80 may be brazed over the inlet 68 to the refresher passageway 66 after the casting is completed and blade or airfoil has been tested for flow. The independent refresher passageways and metering plate allows for a sturdy core during casting, a light weight shank, and adjustable metering of the refresher flow.

Illustrated in FIG. 2 is a cross-section of the exemplary airfoil illustrated herein. The forward flowing serpentine cooling circuit 36 is illustrated as having no film cooling holes while the aft flowing serpentine cooling circuit 38 is illustrated as having pressure side wall film cooling holes 62 in the first, middle, and last cooling channels 40, 41, and 42. The pressure side wall film cooling holes 62 are disposed through the outer wall 15 along the pressure side wall 16 of the outer wall 15 along the aft flowing serpentine cooling circuit 38. The film cooling holes are compound angled downstream and radially outward with respect to the engine centerline 11 and leading out from channels and the leading edge cooling plenum 72 through the outer wall 15. Film cooling holes may be placed along both the pressure and suction side walls 16 and 18, respectively, of the outer wall 15.

The airfoil 12 may have any other conventional features for enhancing the cooling thereof such as turbulators or pins (not shown) which are well known in the art. Thermal barrier coatings TBC, well known in the technology, may also be used to improve thermal characteristics of the airfoil 12.

Although the invention has been described with respect to the exemplary turbine blade 10 illustrated in the FIGS., it may also be used for turbine nozzle vanes which have similar airfoils which can benefit from preferential spanwise cooling thereof for better matching the radial applied temperature distribution from the combustion gases 32. The forward and aft flowing serpentine cooling circuit airfoils and blades may be readily manufactured using conventional casting techniques as are used for conventional multi-pass serpentine passages.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A gas turbine engine hollow airfoil comprising;
an airfoil outer wall having widthwise spaced apart pressure and suction side walls joined together at chordally spaced apart leading and trailing edges of said airfoil and extending radially from a radially inner base to a radially outer airfoil tip,
a cooling circuit within said airfoil said cooling circuit having radially extending first, middle, and last channels arranged respectively in series,
said first channel being in fluid communication with a source of cooling air from outside said airfoil,
said last channel being in fluid communication with one of said edges,
a refresher passageway extending through a radially inner wall bounding a radially inner portion of said last channel and in fluid communication with said source of cooling air,
said refresher passageway is separate, spaced apart, and independent from said first channel,
an edge cooling plenum located between said last channel and said one of said edges and cooling air discharge apertures disposed through a radially extending rib between said last channel and said edge cooling plenum, and
wherein said edge cooling plenum is a leading edge cooling plenum and said cooling air discharge apertures are impingement cooling holes.

2. An airfoil as claimed in claim 1 further comprising leading edge cooling holes leading out of said edge cooling plenum through said outer wall around said leading edge.

3. A gas turbine engine hollow airfoil comprising:
an airfoil outer wall having widthwise spaced apart pressure and suction side walls joined together at chordally spaced apart leading and trailing edges of said airfoil and extending radially from a radially inner base to a radially outer airfoil tip,
a cooling circuit within said airfoil said cooling circuit having radially extending first, middle, and last channels arranged respectively in series,
said first channel being in fluid communication with a source of cooling air from outside said airfoil,
said last channel being in fluid communication with one of said edges,
a refresher passageway extending through a radially inner wall bounding a radially inner portion of said last channel and in fluid communication with said source of cooling air,
said refresher passageway is separate, spaced apart, and independent from said first channel, and
a metering plate covering an inlet to said refresher, passageway said metering plate having a metering hole over said inlet.

4. An airfoil as claimed in claim 3 wherein said metering hole is adjustable.

5. A gas turbine engine blade comprising:
a hollow airfoil extending radially outwardly from a root;
said airfoil comprising an airfoil outer wall having widthwise spaced apart pressure and suction side walls joined together at chordally spaced apart leading and trailing edges of said airfoil and extending radially from a radially inner base at said root to a radially outer airfoil tip,
a cooling circuit within said airfoil,
said cooling circuit having radially extending first, middle, and last channels arranged respectively in series,
said first channel extending through said root and having an entrance at a bottom surface of said root,
said last channel being in fluid communication with one of said edges,
a refresher passageway extending through a radially inner wall bounding a radially inner portion of said last channel and through said root,
said refresher passageway having an inlet at said bottom surface of said root, said inlet being separate and spaced apart from said entrance, an edge cooling plenum located between said last channel and said one of said edges and cooling air discharge apertures disposed through a radially extending rib between said last channel and said edge cooling plenum, and
wherein said edge cooling plenum is a leading edge cooling plenum and said cooling air discharge apertures are impingement cooling holes.

6. A blade as claimed in claim 5 further comprising leading edge cooling holes leading out of said edge cooling plenum through said outer wall around said leading edge.

7. A gas turbine engine blade comprising:
a hollow airfoil extending radially outwardly from a root;
said airfoil comprising an airfoil outer wall having widthwise spaced apart pressure and suction side walls joined together at chordally spaced apart leading and trailing edges of said airfoil and extending radially from a radially inner base at said root to a radially outer airfoil tip,
a cooling circuit within said airfoil,
said cooling circuit having radially extending first, middle, and last channels arranged respectively in series,
said first channel extending through said root and having an entrance at a bottom surface of said root,
said last channel being in fluid communication with one of said edges,
a refresher passageway extending through a radially inner wall bounding a radially inner portion of said last channel and through said root, said refresher passageway having an inlet at said bottom surface of said root, said inlet being separate and spaced apart from said entrance, and a metering plate on said bottom surface of said root, said metering plate covering said inlet to said refresher passageway, and said metering plate having a metering hole over said inlet.

8. A blade as claimed in claim 7 wherein said metering hole is adjustable.

9. A gas turbine engine blade comprising:

a hollow airfoil extending radially outwardly from a root;

said airfoil comprising an airfoil outer wall having widthwise spaced apart pressure and suction side walls joined together at chordally spaced apart leading and trailing edges of said airfoil and extending radially from a radially inner base at said root to a radially outer airfoil tip, a forward flowing serpentine cooling circuit and an aft flowing serpentine cooling circuit within said airfoil, said cooling circuits each having radially extending first, middle, and last channels arranged respectively in series, each of said first channels extending through said root and having an entrance at a bottom surface of said root, said last channel of said forward flowing serpentine cooling circuit in fluid communication with said leading edge, said last channel of said aft flowing serpentine cooling circuit in fluid communication with said trailing edge, forward and aft refresher passageways extending through forward and aft radially inner walls bounding radially inner portions of said forward and aft last channels, respectively, and through said root, and said refresher passageways having inlets at said bottom surface of said root, said inlets being separate and spaced apart from said entrances.

10. A blade as claimed in claim 9 further comprising a leading edge cooling plenum located between said last channel of said forward flowing serpentine cooling circuit and impingement cooling holes disposed through a radially extending rib between said last channel of said forward flowing serpentine cooling circuit and said leading edge cooling plenum.

11. A blade as claimed in claim 10 further comprising leading edge cooling holes leading out of said leading edge cooling plenum through said outer wall around said leading edge.

12. A blade as claimed in claim 11 wherein said last channel is bounded by said trailing edge of said aft flowing serpentine cooling circuit.

13. A blade as claimed in claim 12 further comprising cooling air discharge apertures disposed through said trailing edge.

14. A blade as claimed in claim 13 wherein said cooling air discharge apertures are trailing edge cooling slots.

15. A blade as claimed in claim 14 furtherer comprising metering plates on said bottom surface of said root, said metering plates covering said inlets to said refresher passageways, and said metering plates having metering holes over said inlets.

16. A blade as claimed in claim 15 wherein said metering holes is adjustable.

17. A blade as claimed in claim 9 furtherer comprising metering plates on said bottom surface of said root, said metering plates covering said inlets to said refresher passageways, and said metering plates having metering holes over said inlets.

18. A blade as claimed in claim 17 wherein said metering holes is adjustable.

* * * * *